US010050727B2

(12) United States Patent
Cohen et al.

(10) Patent No.: US 10,050,727 B2
(45) Date of Patent: Aug. 14, 2018

(54) PEAK DETECTION IN DATA STREAM

(71) Applicants: MAXIM INTEGRATED PRODUCTS, INC., San Jose, CA (US); Elik Cohen, Fremont, CA (US); Kourosh Pahlavan, Cupertino, CA (US)

(72) Inventors: Elik Cohen, Fremont, CA (US); Kourosh Pahlavan, Cupertino, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 15/529,051

(22) PCT Filed: Nov. 24, 2015

(86) PCT No.: PCT/US2015/062533
§ 371 (c)(1),
(2) Date: May 23, 2017

(87) PCT Pub. No.: WO2016/086065
PCT Pub. Date: Jun. 2, 2016

(65) Prior Publication Data
US 2017/0264380 A1 Sep. 14, 2017

Related U.S. Application Data

(60) Provisional application No. 62/084,394, filed on Nov. 25, 2014.

(51) Int. Cl.
*H04B 17/26* (2015.01)
(52) U.S. Cl.
CPC .................................. *H04B 17/26* (2015.01)

(58) Field of Classification Search
CPC ........... G01R 19/00; H03M 1/00; H04B 1/00; H04B 1/16; H04B 1/69; H04B 1/707;
(Continued)

(56) References Cited

U.S. PATENT DOCUMENTS 5,530,601 A    6/1996  Hutchins et al.
6,925,108 B1*  8/2005  Miller ..................... G01S 7/023
                                                         375/132

(Continued)

OTHER PUBLICATIONS

International Search Report dated Mar. 14, 2016, in International Application No. PCT/US2015/062533, filed Nov. 24, 2015 (3pgs).
(Continued)

*Primary Examiner* — Shawkat M Ali
(74) *Attorney, Agent, or Firm* — North Weber & Baugh LLP

(57) ABSTRACT

Embodiments of the present invention include methods and systems for detecting a peak of an ultra-wide-band (UWB) signal in a data stream. The system (1100) for detecting a peak of an ultra-wide-band (UWB) signal (1120) in a data stream (102) includes: one or more processors (1001); and a non-transitory computer-readable medium or media (1002) comprising one or more sequences of instructions which, when executed by the one or more processors (1001), causes steps to be performed comprising: selecting a portion (104) of a data stream (102) in a current clock cycle, the portion (104) of the data stream includes a preset number of data samples; finding a set of data samples included in the preset number of data samples, the set of data samples includes one or more consecutive data samples and has a uniform magnitude; and promoting the set of data samples as a peak if the uniform magnitude is higher than a magnitude of a first data sample that immediately precedes the set of data samples and a magnitude of a second data sample that immediately follows the set of data samples.

12 Claims, 8 Drawing Sheets

(58) Field of Classification Search
CPC ...... H04B 1/7163; H04B 10/04; H04B 17/26; H04B 27/06; H04L 12/26; H04L 12/43; H04L 27/00; H04L 27/04; H04N 11/02
USPC .......... 327/58; 341/132; 375/130, 147, 150, 375/219, 228, 295, 316, 340; 455/102, 455/423, 514
See application file for complete search history.

(56) References Cited

U.S. PATENT DOCUMENTS

| | | | |
|---|---|---|---|
| 7,010,056 B1* | 3/2006 | McCorkle | H04B 1/7172 375/286 |
| 7,463,899 B2 | 12/2008 | Riley et al. | |
| 8,116,350 B1 | 2/2012 | Arndt et al. | |
| 8,208,587 B2* | 6/2012 | Chong | G01S 3/043 375/340 |
| 2004/0136438 A1* | 7/2004 | Fullerton | H03C 1/02 375/130 |
| 2005/0147079 A1* | 7/2005 | Lakkis | H04B 1/7183 370/350 |
| 2006/0007986 A1* | 1/2006 | Larsson | H04B 1/71637 375/130 |
| 2007/0194978 A1* | 8/2007 | Teshirogi | G01S 7/03 342/28 |
| 2008/0116941 A1 | 5/2008 | Ekbal et al. | |
| 2008/0192810 A1* | 8/2008 | Razzell | H04L 27/0006 375/150 |
| 2009/0034650 A1* | 2/2009 | Norimatsu | H04B 1/7174 375/295 |
| 2009/0154526 A1* | 6/2009 | Okita | H04B 1/719 375/130 |
| 2013/0235955 A1 | 9/2013 | Xu et al. | |

OTHER PUBLICATIONS

Written Opinion dated Mar. 14, 2016, in International Application No. PCT/US2015/062533, filed Nov. 24, 2015 (4pgs).

* cited by examiner

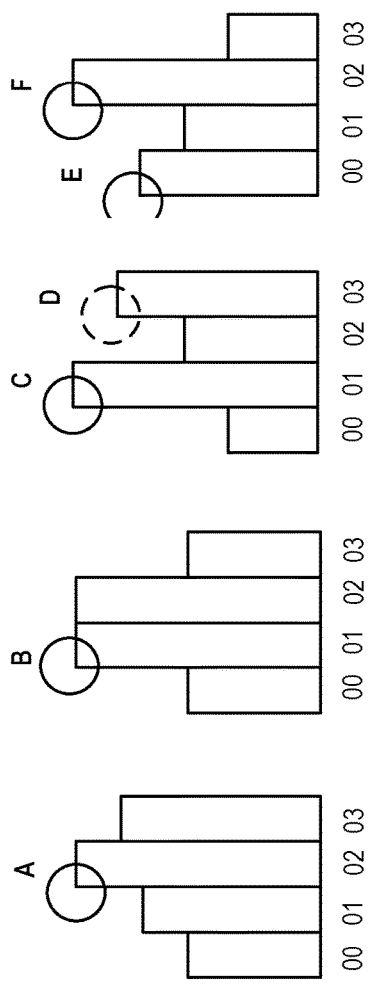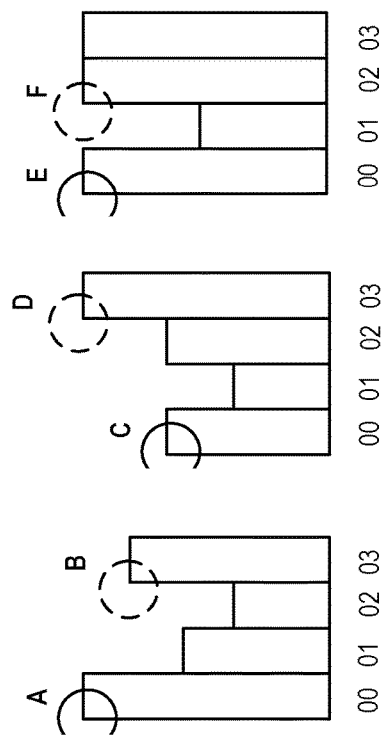

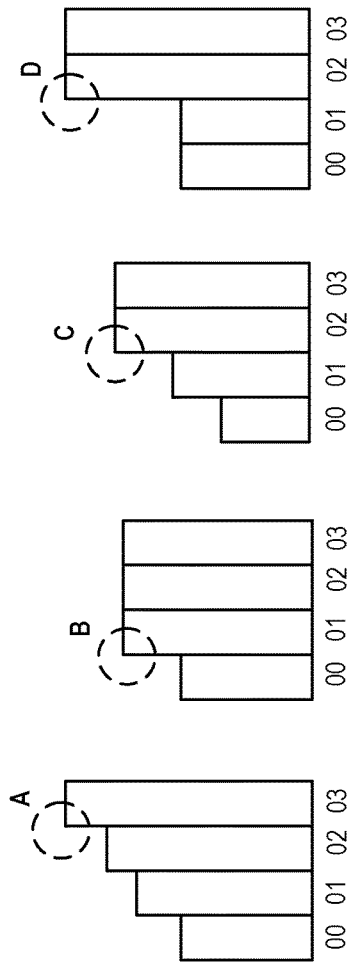
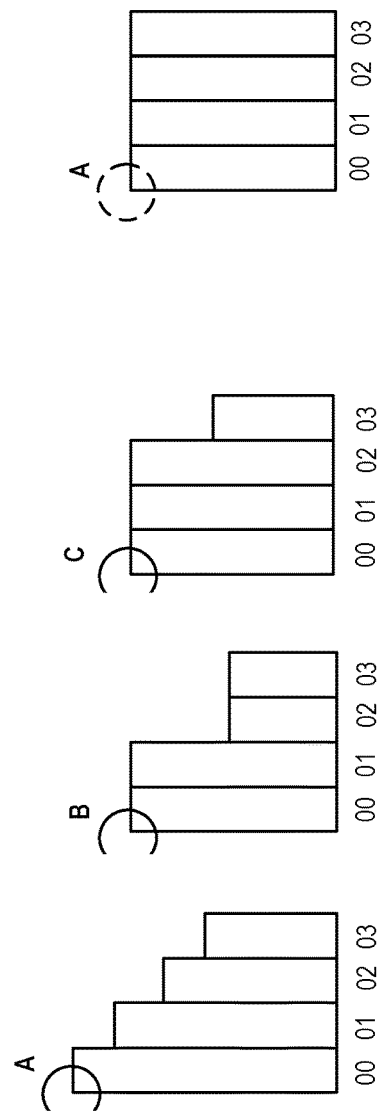

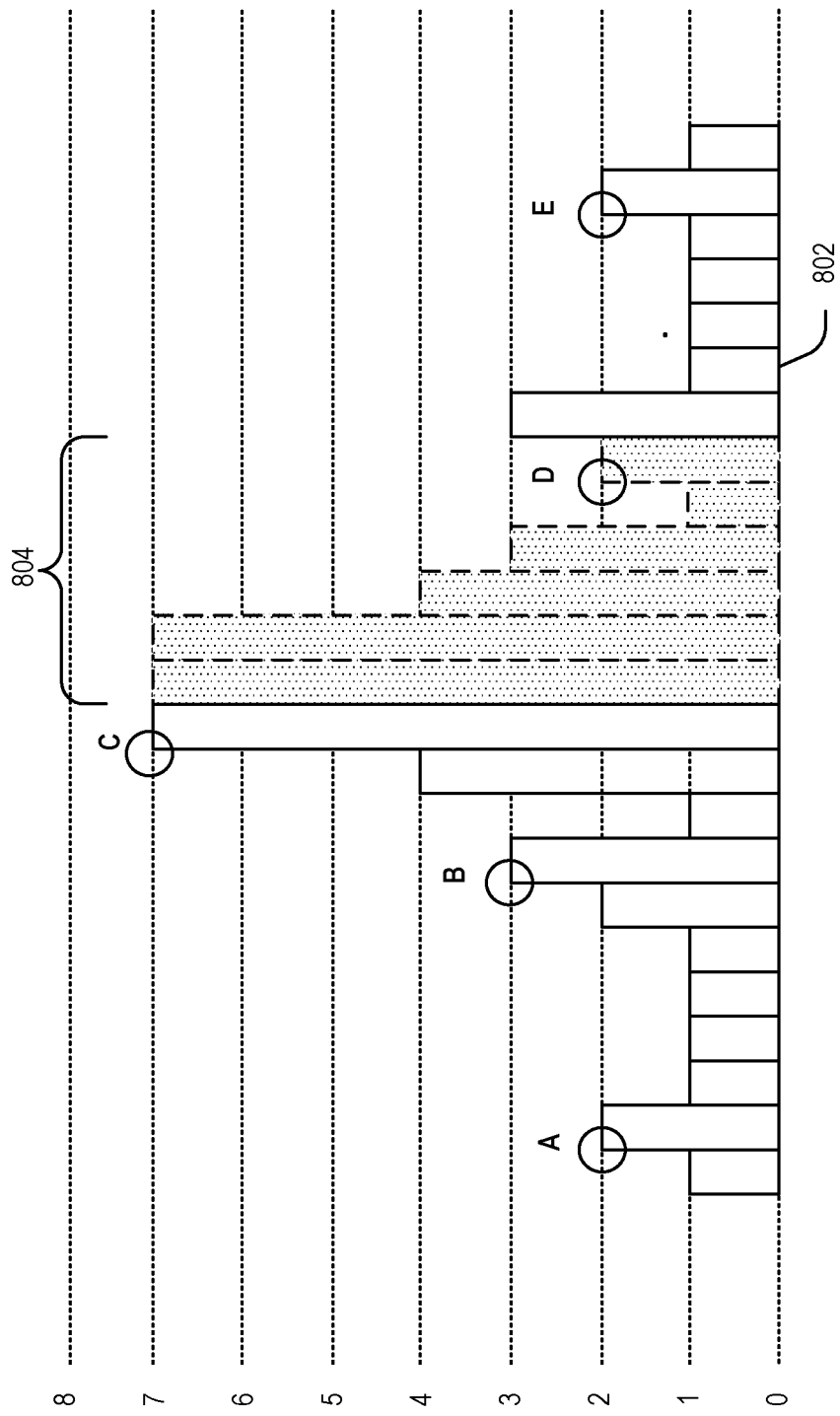

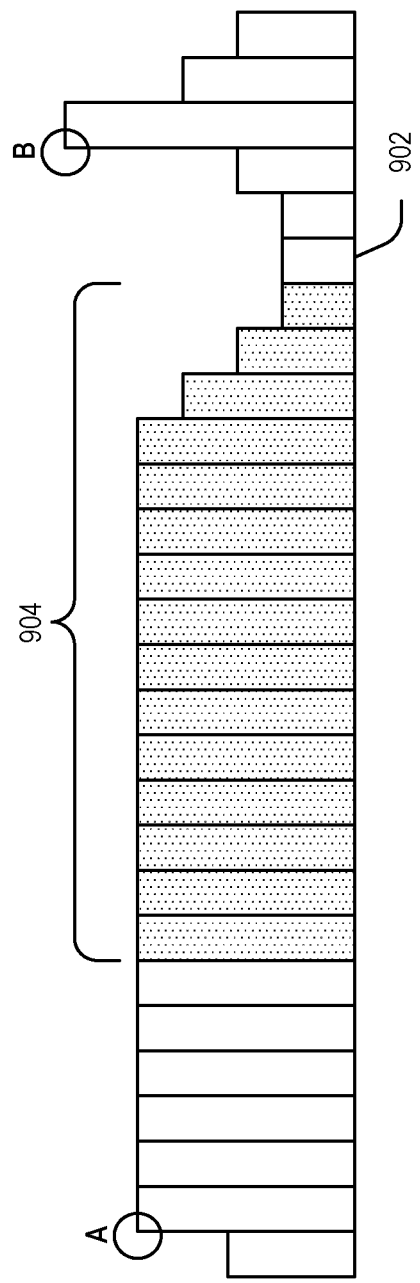

PEAK DETECTION IN DATA STREAM

CROSS-REFERENCE TO RELATED APPLICATIONS

This is a PCT 371 National Stage Patent Application of International PCT Patent Application No. PCT/US15/62533, entitled, "PEAK DETECTION IN DATA STREAM," naming as inventors Elik Cohen and Kourosh Pahlavan, and filed Nov. 24, 2015, which application claims priority to Provisional Patent Application No. 62/084,394, entitled, "PEAK DETECTION IN DATA STREAM," naming as inventors Elik Cohen and Kourosh Pahlavan, and filed Nov. 25, 2014, which applications are hereby incorporated herein by reference in their entireties.

BACKGROUND

A. Technical Field

The present invention relates to signal processing, and more particularly, to systems and methods for detecting peaks of signals in a continuous data stream.

B. Background of the Invention

Various techniques for detecting peaks of signals in a continuous data stream have been developed in the past decades. For instance, ultra-wide band (UWB), which is a radio technology, is used at a very low energy level for short-range, high-bandwidth communications using a large portion of the radio spectrum. Recently, UWB has been applied to collect target sensor data, locate and track target sensors with high precision. A receiver of UWB signals/pulses that are transmitted by a UWB transmitter should be able to detect/identify the UWB signals in a continuous data stream that is typically mixed with noise. To identify the UWB signals, the receiver should be able to detect the peaks of the UWB signals.

In some applications, the pulse widths of UWB signals may decrease to the order of nanosecond. As such, techniques for detecting the UWB signals should be carefully designed to capture the peaks of short UWB signals and differentiate the desired signals from noise. Another challenge that a signal processing engineer has to cope with is associated with multipath reflections of a strong pulse in the digital domain. For instance, when a transmitter transmits a UWB signal, the signal may be reflected by objects before it arrives at a receiver. As such, when an incoming signal is reconstructed/represented by the receiver in the digital domain, the reflected signals (or, equivalently, multipath reflections) may be superimposed onto the direct UWB signal. As a first step to differentiate the desired signal from the multipath reflections and/or other noise, it is necessary to detect/identify peaks of the desired signals in the continuous data stream. Thus, there is a need for a method for detecting the peaks of signals in a continuous data stream.

SUMMARY OF THE INVENTION

In one aspect of the present invention, a method for detecting a peak of a ultra-wide-band (UWB) signal in a data stream includes: selecting a portion of a data stream in a current clock cycle, the portion of the data stream includes a preset number of data samples; finding a set of data samples included in the preset number of data samples, the set of data samples includes one or more consecutive data samples and has a uniform magnitude; and promoting the set of data samples as a peak if the uniform magnitude is higher than a magnitude of a first data sample that immediately precedes the set of data samples and a magnitude of a second data sample that immediately follows the set of data samples.

In another aspect of the present invention, a system for detecting a peak of an ultra-wide-band (UWB) signal in a data stream includes: one or more processors; and a non-transitory computer-readable medium or media comprising one or more sequences of instructions which, when executed by the one or more processors, causes steps to be performed comprising: selecting a portion of a data stream in a current clock cycle, the portion of the data stream includes a preset number of data samples; finding a set of data samples included in the preset number of data samples, the set of data samples includes one or more consecutive data samples and has a uniform magnitude; and promoting the set of data samples as a peak if the uniform magnitude is higher than a magnitude of a first data sample that immediately precedes the set of data samples and a magnitude of a second data sample that immediately follows the set of data samples.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGS. 3A-3D show exemplary samples having concave patterns according to one embodiment of the present invention.

FIGS. 4A-4C show exemplary samples having convex patterns according to one embodiment of the present invention.

FIGS. 5A-5D show exemplary samples having monotonic up (rising) patterns according to one embodiment of the present invention.

FIGS. 6A-6C show exemplary samples having monotonic down (falling) patterns according to one embodiment of the present invention.

FIG. 7 shows exemplary samples having a constant pattern according to one embodiment of the present invention.

FIG. 8 shows a waveform subject to filtering according to one embodiment of the present invention.

FIG. 9 shows a constant waveform that is not subject to filtering according to one embodiment of the present invention.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components may be modified or otherwise changed through the addition thereto of intermediary components, without departing from the teachings of the present invention.

Figure 1A:
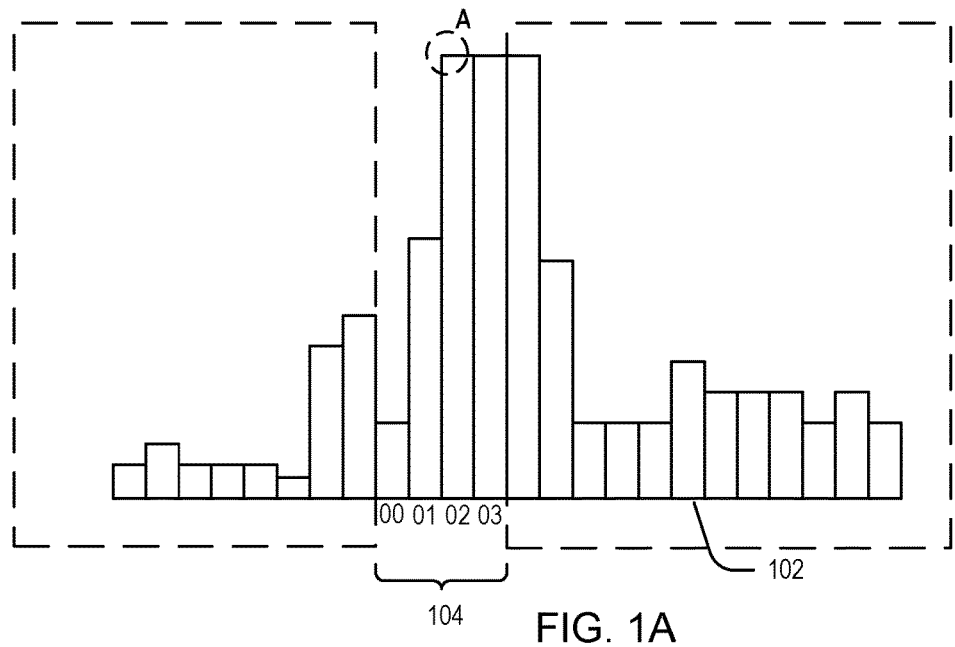
FIGS. 1A and 1B show data sampling windows applied to a continuous data stream to detect peaks according to one embodiment of the present invention.
Figure 1B:
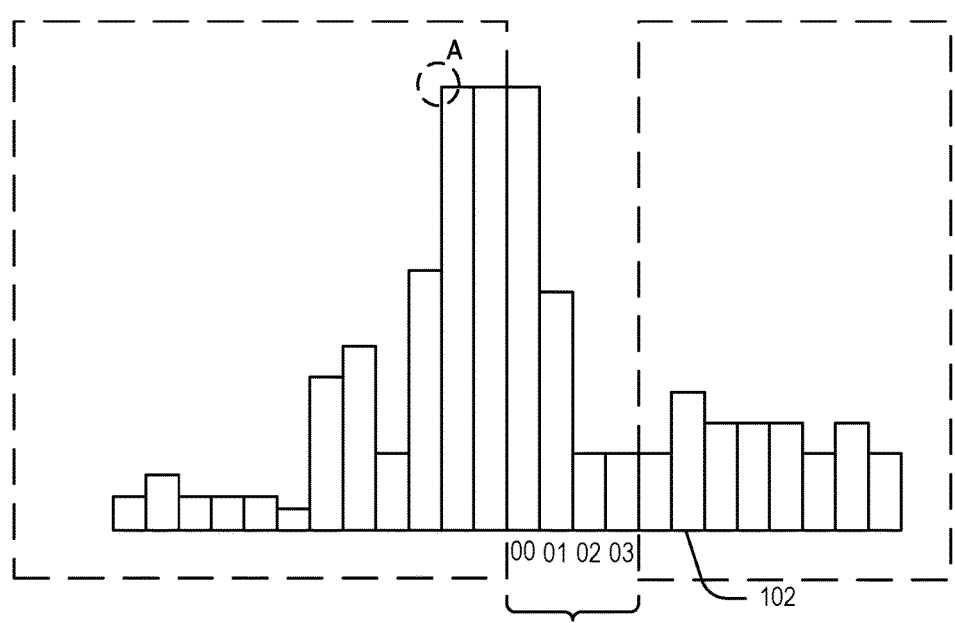

FIGS. 1A and 1B show data sampling windows 104 and 114 applied to a continuous data stream 102 to detect peaks according to one embodiment of the present invention. As depicted in FIG. 1A, four samples, 00, 01, 02, and 03, are simultaneously taken in each clock cycle, i.e., the electronic hardware/algorithm may "see" the continuous data stream (or, equivalently waveform) as one four-sample window of samples at a time. It is noted that any suitable number of samples may be taken simultaneously in each clock cycle. For instance, the four-sample window may be extended to an eight-sample window. Likewise, the electronic hardware/algorithm may see the waveform as two or more four-sample windows of samples at a time. In the present application, for brevity, only one four-sample window is considered in detecting peaks on the waveform 102 in each clock cycle.

"Looking Glass" problem: The primary challenge of the peak-detector implementation may be that the samples observed in any given clock cycle are finite, while the determination of whether a given sample is to be "crowned" as a peak depends on previous samples as well as future samples. FIGS. 1A and 1B illustrate a case in which the knowledge of future samples is necessary to resolve whether the sample A is a peak.

As depicted in FIGS. 1A and 1B, the sample A may be identified as a "candidate peak" in the $n^{th}$ clock cycle, but it's not until the following clock cycle that the algorithm can determine with certainty that sample A is indeed a peak. The data from the $n^{th}$ clock cycle is gone in $(n+1)^{th}$ clock cycle, and thus, there is need to store information from the past for properly identifying peaks in the "future." This type of identification is referred to as forward checking or backward peak nomination.

Figure 2:
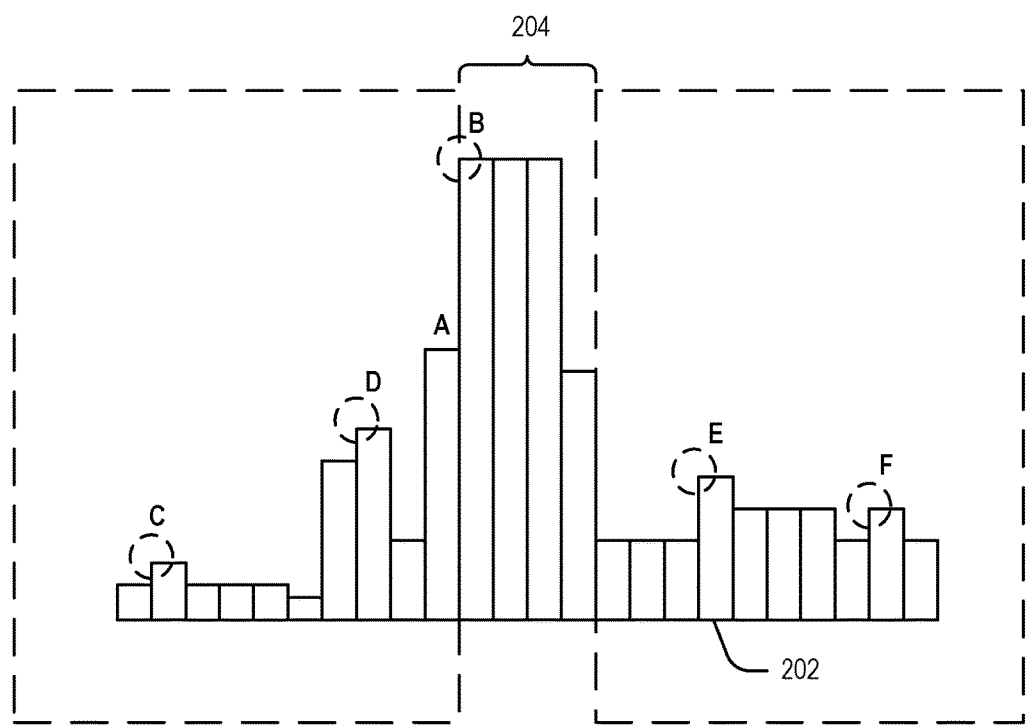
FIG. 2 shows a data sampling window applied to a continuous data stream to detect peaks according to one embodiment of the present invention.

Another interesting case of the "Looking Glass" is when a sample in the current frame can be "crowned" as a peak only if certain conditions in the previous frame allow it. FIG. 2 shows a data sampling window 204 applied to a continuous data stream 202 to detect peaks according to one embodiment of the present invention. As depicted, at a given clock cycle, the sample B can be "nominated" as a peak, but only if the algorithm can examine the sample B from the window observed in the preceding clock cycle. This type of identification is referred to as backward checking or forward peak nomination.

"Sample classification: When processing the sample stream through the "Looking Glass," the samples that are peaks or candidate-peaks may be classified as follows: (1) Definite Peak (DP): DP is marked as a solid circle, such as sample A in FIG. 3A. DP is an unambiguous peak sample and will be time-stamped. (2) Forward Check (FC) candidate: FC is marked as a dashed circle, such as sample D in FIG. 3C. FC is a sample that might be promoted (or demoted) to being a peak, in a later window, but the information obtained in the current sample window is not sufficient to determine whether it is a peak. (3) Backwards Check (BC) candidate: BC is marked as an incomplete circle, such as sample E in FIG. 3D. BC is a sample that may be promoted (or demoted) to being a peak, based on some past information. In the present application, the magnitudes of the samples in the current four-sample window are defined in a binary notation, CM00, CM01, CM02, and CM03, where the "older" sample is CM00 and the "newer" sample is CM03. Also, the notation PM03 denotes the last (newer) sample in the preceding four-sample window.

Window pattern classification: The "Looking Glass" window allows examination of four consecutive samples at a time. For convenience, the observed patterns of the four samples are classified and defined as follows:

(1) Concave (wave-like) shape/pattern: This class of shapes includes those sets of four sample windows which have a form of concavity or wave-like shape. FIGS. 3A-3D show exemplary samples having concave shapes according to one embodiment of the present invention. As depicted, each of FIGS. 3A-3D shows four samples having a concave pattern and a DP.

The DPs (i.e., samples A, B, C and F) in FIGS. 3A-3D are determined as such since the conditions for peak within the same window of samples can be identified without information of samples in the past or later window. The sample D in FIG. 3C is a FC candidate because it may be promoted (or demoted) to a peak in a later window but the information obtained in the current sample window is not sufficient to determine whether it is a peak. The sample E is a BC candidate since it may be promoted (or demoted) to a peak based on the information of the samples taken in the preceding window.

The conditions for deciding if a sample is DP, FC or BC in the current window can be expressed as following equations:

$$DP=((CM01>CM00) \text{ AND } (CM01>CM02)) \text{ OR } \\ ((CM01>CM00) \text{ AND } (CM01==CM02) \text{ AND } \\ (CM01>CM03)) \text{ OR } ((CM02>CM01) \text{ AND } \\ (CM02>CM03)) \quad (1)$$

$$BC=(CM00>CM01) \text{ AND } ((FC<CM00) \text{ OR } \\ (PM03<CM00)) \quad (2)$$

$$FC=(CM03>CM02) \quad (3)$$

(2) Convex shape/pattern: This class of shapes includes those sets of four sample windows which have a convex like form. FIGS. 4A-4C show exemplary samples having convex patterns according to one embodiment of the present invention. In each of the four windows shown in FIGS. 4A-4A, the first sample may be a BC while the last sample may be a FC.

The conditions for deciding if a sample is DP, FC or BC in the current window can be expressed as following equations:

$$DP=0 \quad (4)$$

$$BC=((CM00>CM01) \text{ OR } ((CM00==CM01) \text{ AND } \\ (CM01>CM02))) \text{ AND } ((FC<CM00) \text{ OR } \\ (PM03<CM00)) \quad (5)$$

$$FC=((CM03>CM02) \text{ OR } ((CM02>CM01) \text{ \&\& } \\ (CM02==CM03)) \quad (6)$$

(3) Monotonic up pattern: This class of shapes includes those sets of four sample windows which have a monotonic up (rising) shape. FIGS. 5A-5D show exemplary samples having rising patterns according to one embodiment of the present invention.

The conditions for deciding if a sample is DP, FC or BC in the current window can be expressed as following equations:

$$DP=0 \quad (7)$$

$$BC=0 \quad (8)$$

$$FC=((CM03>CM02) \text{ OR } ((CM02>CM01) \text{ AND } \\ (CM02==CM03)) \text{ OR } ((CM01>CM00) \text{ AND } \\ (CM01==CM02) \text{ \&\& } (CM02==CM03)) \quad (9)$$

(4) Monotonic down (falling) pattern: This class of shapes includes those sets of four sample windows which have a monotonic down (falling) pattern. FIGS. 6A-6C show exemplary samples having falling patterns according to one embodiment of the present invention.

The conditions for deciding if a sample is DP, FC or BC in the current window can be expressed as following equations:

$$DP=0 \quad (10)$$

$$BC=((CM00>CM01) \text{ OR } ((CM00==CM01) \text{ AND } \\ (CM01>CM02)) \text{ OR } ((CM00==CM01) \text{ AND } \\ (CM01==CM02) \text{ \&\& } (CM02>CM03))) \text{ AND } \\ ((FC<CM00) \text{ OR } (PM03<CM00)) \quad (11)$$

$$FC=0 \quad (12)$$

(5) Constant pattern: This pattern includes those sets of four sample windows which have a constant magnitude. FIG. 7 shows exemplary samples having a constant pattern according to one embodiment of the present invention.

The conditions for deciding if a sample is DP, FC or BC in the current window can be expressed as following equations.

$$DP=0 \quad (13)$$

$$BC=0 \quad (14)$$

$$FC=((CM00==CM01) \text{ AND } (CM01==CM02) \text{ AND } \\ (CM02==CM03)) \text{ AND } ((FC<CM00) \text{ OR } \\ (PM03<CM00)) \quad (15)$$

Table 1 shows the list of equations based on the different pattern classifications, where the equations derived for each class are combined into a single equation per type of peak.

TABLE 1

Consolidated equations for DP, FC, and BC

| Peak type | Condition | Sample Index |
| --- | --- | --- |
| DDP | ((CM01 > CM00) AND (CM01 > CM02)) | 01 |
|  | ((CM01 > CM00) AND (CM01 == CM02) AND (CM02 > CM03)) | 01 |
|  | ((CM02 > CM01) AND (CM02 > CM03)) | 02 |

TABLE 1-continued

Consolidated equations for DP, FC, and BC

| Peak type | Condition | Sample Index |
| --- | --- | --- |
| BBC | (CM00 > CM01) AND ((FC < CM00) OR (PM03 < CM00)) | 00 |
|  | (CM00 > CM01) AND ((FC < CM00) OR (PM03 < CM00)) | 00 |
|  | ((CM00 == CM01) AND (CM01 > CM02)) AND ((FC < CM00) OR (PM03 < CM00)) | 00 |
|  | ((CM00 == CM01) AND (CM01 == CM02) AND (CM02 > CM03)) AND ((FC < CM00) OR (PM03 < CM00)) | 00 |
| FFC | (CM03 > CM02) | 03 |
|  | (CM02 > CM01) AND (CM02 == CM03) | 02 |
|  | ((CM01 > CM00) AND (CM01 == CM02) && (CM02 == CM03)) | 01 |
|  | ((CM00 == CM01) AND (CM01 == CM02) AND (CM02 == CM03)) AND ((FC < CM00) OR (PM03 < CM00)) | 00 |

Promotion and demotion of FC and BC samples: The FC and BC samples are just candidates for being peaks. The determination whether an FC sample is to be a peak or is to be ignored depends on future information. The determination whether a BC sample is to be a peak or to be ignored depends on past information. The determination whether an FC or BC sample is to be a peak is referred to as "promotion" and the determination whether an FC or BC sample is not to be a peak as "demotion".

For BC type samples, the promotion/demotion is immediate and follows directly from Table 1, and, when the conditions are met, a BC sample will only be in index 00. For FC type samples, the promotion (or demotion) happens in a future sample window (may not be the immediate sample window where the FC was first identified).

For a given sample window, if an FC was previously set, a promotion to a peak will be made if one of the following conditions are met:

FC is promoted if and only if FC exists AND:
(FC>CM00) OR
((FC==CM00) AND (FC>CM01)) OR
((FC==CM00) AND (CM00==CM01) (CM01>CM02)) OR
(FC==CM00) AND (CM00==CM01) AND (CM01==CM02) AND (CM02>CM03) OR
TIMEOUT on constant waveform An FC is not updated if, and only if the FC sample has a "constant" pattern, and the FC is equal to the magnitude of the samples in the current window:

FC remains unmodified if and only if:
(FC==CM00) AND (CM00==CM01) AND (CM01==CM02) AND (CM02==CM03)
No timeout this window An FC is demoted if and only if the following conditions are met:

FC demoted if and only if:
(FC exists) AND NOT ((FC promotion) OR (FC remains unmodified))

Masking samples after a peak is detected: Typically, a continuous data stream includes desired signal mixed with irrelevant noise, where, without proper filtering mechanisms, the noise may result in too many peaks. Thus, it is desirable to have a programmable duration, after the detection of a peak, during which no additional peaks are to be detected. In embodiments, this duration may depend on the magnitude of the previously detected peak, i.e., a magnitude-based-filtering may be applied. For instance, the maximum magnitude of a peak may be divided into eight levels and the actual peak magnitude will be compared to the eight levels for determination of the number of "filtered" samples. Table 2 shows eight levels of the peak magnitudes and the filtering durations for the eight levels, where the respective DLYMAGx (delay-based-on-magnitude) are programmable, eight-bit register fields. Table 3 shows eight levels of the peak magnitudes and exemplary filtering durations in the unit of samples to be ignored and not time stamped. For instance, when a detected peak has the magnitude of seven, the peaks in the following seven samples are ignored and not time stamped. It is noted that the peak magnitudes in Tables 2 and 3 may be divided into any suitable number of levels and the filtering durations may be set to any suitable time periods.

TABLE 2

Exemplary peak magnitude levels and filtering durations

| Peak Magnitude | Filtering Duration [samples] |
| --- | --- |
| 1 | DLYMAG1 [7:0] |
| 2 | DLYMAG2 [7:0] |
| 3 | DLYMAG3 [7:0] |
| 4 | DLYMAG4 [7:0] |
| 5 | DLYMAG5 [7:0] |
| 6 | DLYMAG6 [7:0] |
| 7 | DLYMAG7 [7:0] |
| 8 | DLYMAG8 [7:0] |

TABLE 3

Exemplary peak magnitude levels and filtering durations

| Peak Magnitude | Filtering Duration [samples] |
| --- | --- |
| 1 | DLYMAG1 = 0 |
| 2 | DLYMAG2 = 0 |
| 3 | DLYMAG3 = 0 |
| 4 | DLYMAG4 = 0 |
| 5 | DLYMAG5 = 0 |
| 6 | DLYMAG6 = 0 |
| 7 | DLYMAG7 = 6 |
| 8 | DLYMAG8 = 6 |

For the purpose of illustration, the set of peak levels and filtering durations shown in Table 3 may be applied to the waveform in FIG. 8. FIG. 8 shows a waveform 802 subject to filtering according to one embodiment of the present invention. As depicted, the detected peaks A, B and E, are of magnitude of two or three. Thus, according to Table 3, the filtering durations for the peaks A, B and E are zero, i.e., there is no filtering applied after the detection of the peaks A, B, and E. However, since the peak C is of magnitude seven, the non-zero value in DLYMAG7 applies so that any peak detected in the next six samples is ignored and not time-stamped. Stated differently, any peak detected during the time interval 804 is ignored. This is why the sample D is ignored, even though it is a valid peak in the sample stream.

Timeout mechanism: It is possible that a constant waveform, such as the waveform pattern described in conjunction with FIG. 7, may be processed for the peak detection. In embodiments, when the length of the constant "sample-train" is above a certain threshold (say 256 samples), the leading edge sample of the constant waveform may be set as a "peak". Since the peak is declared on magnitude being constant for 256 samples, DLYMAGx filtering in Table 2, which has a maximum filter length of 255 samples from the peak, does not apply to the timeout peak.

FIG. 9 shows a constant waveform 902 that is not subject to filtering according to one embodiment of the present invention. As depicted, the sample A is detected as a candidate peak, but the determination that it be a peak depends on a sample of lesser magnitude to arrive sometime later (without a sample of higher magnitude to interject in between the sample A and the sample of lesser magnitude). However, if the constant waveform continues for more than 256 samples, the sample A is declared as a peak. The peak detector continues to process samples without filtration and the next peak is detected in the sample B. Note that the timeout mechanism may have an option to be enabled or disabled.

Minimum detection magnitude: It is desirable to have the ability to rule out certain samples from being considered as peaks, based on their magnitude. In embodiments, a peak detection mechanism may include a reference 5 bit configuration register field which will contain the minimum magnitude for the detection of a peak. A setting of "0" for this configuration register field may be equivalent to disabling this feature.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
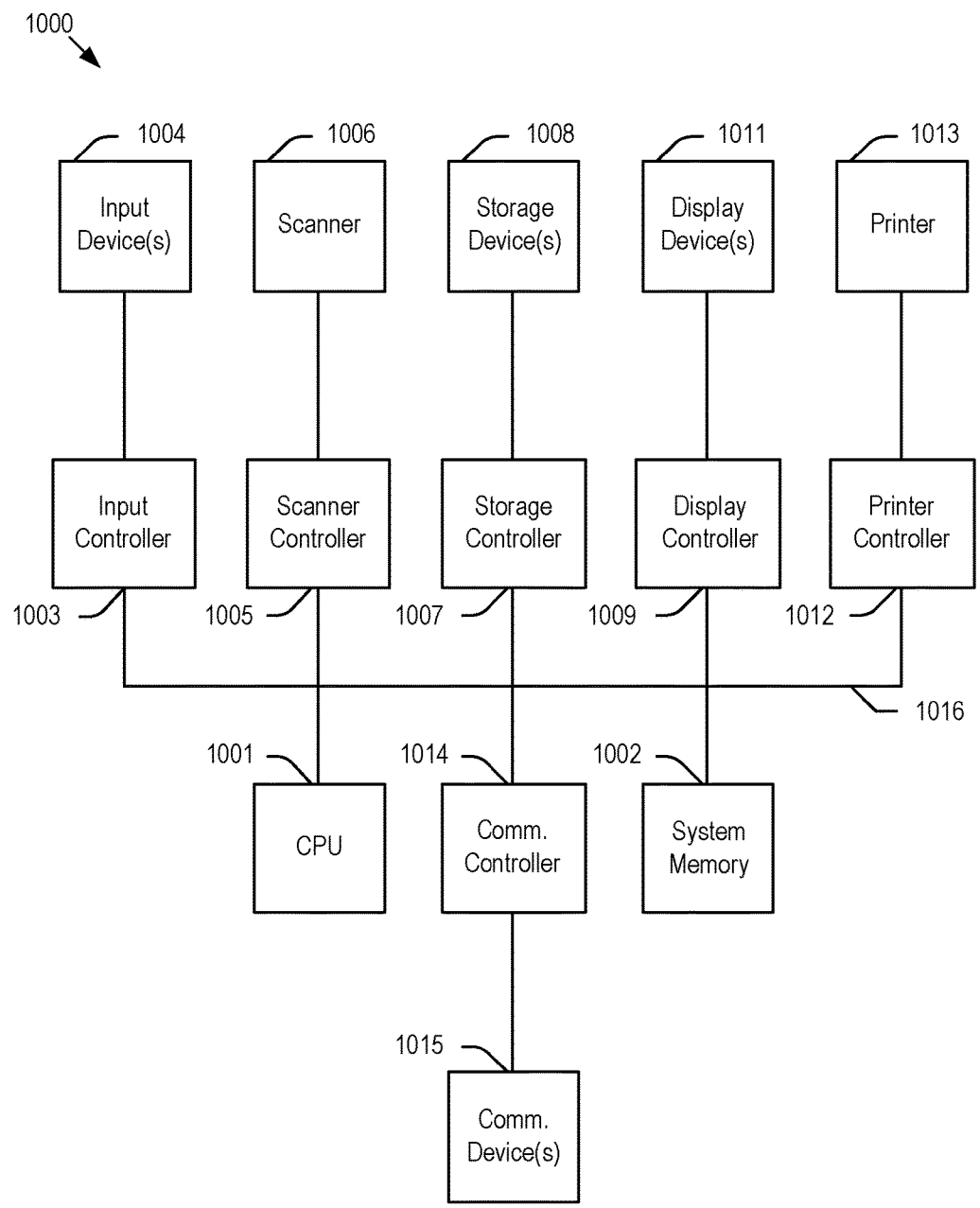
FIG. 10 shows a computer system according to embodiments of the present invention.

Having described the details of the invention, an exemplary system 1000, which may be used to implement one or more aspects of the present invention, will now be described with reference to FIG. 10. As illustrated in FIG. 10, system 1000 includes a central processing unit (CPU) 1001 that provides computing resources and controls the computer. CPU 1001 may be implemented with a microprocessor or the like, and may also include a graphics processor and/or a floating point coprocessor for mathematical computations. System 1000 may also include a system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT), a thin film transistor (TFT) display, or other type of display. System 1000 may also include a printer controller 1012 for communicating with a printer 1013. A communications controller 1014 may interface with one or more communication devices 1015, which enables system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

Figure 11:
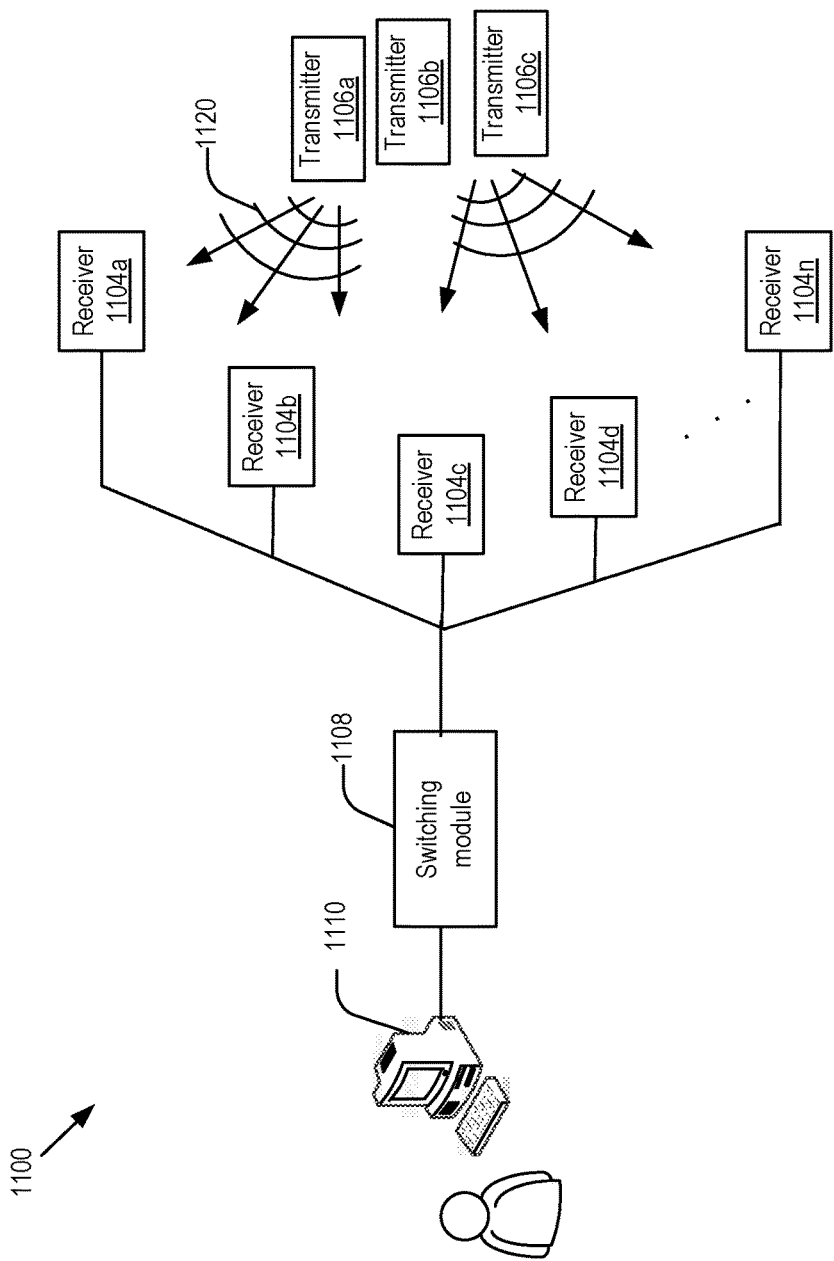
FIG. 11 shows a schematic diagram of an exemplary system for transmitting and receiving UWB signals according to one embodiment of the present invention.

FIG. 11 shows a schematic diagram of an exemplary system 1100 for transmitting and receiving UWB signals according to one embodiment of the present invention. As depicted, one or more UWB transmitters 1106*a*-1106*c* may transmit UWB signals 1120 to one or more receivers 1104*a*-1104*n*. The output signals from the receivers 1104*a*-1104*n* may be sent to a switching module 1108, such as power-over-Ethernet switch, where the switching module 1108 may control the data flow from the receivers 1104*a*-1104*n* to a server 1110, such as computer. For instance, the switching module 1108 may be coupled to the server 1110 via a single cable for transmitting data from and providing electrical power to the receivers 1104*a*-1104*n*.

It should be noted that any suitable number of UWB transmitters may be included in the system 1100. Likewise, it should be noted that any suitable number of UWB receivers may be included in the system 1100. In embodiments, each of the transmitters 1106*a*-1106*c* may be a tag that is able to transmit UWB signals at a preset frequency. In embodiments, using the UWB signals received by the receivers 1104*a*-1104*n* and the triangulation technique, the exact locations of the transmitters 1106*a*-1106*c* may be determined.

In embodiments, the receivers 1104*a*-1104*n* may have the capability to perform the peak detections described in conjunction with FIGS. 1A-8. Also, each receiver may include the system 1100. In other embodiments, the server 1110 may have the capability to perform the peak detections described in conjunction with FIGS. 1A-8. In such embodiments, the server 1110 may include the system 1100.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for detecting a peak of a ultra-wide-band (UWB) signal in a data stream, comprising:

selecting a portion of the data stream in a first clock cycle, the portion of the data stream includes a plurality of data samples that are simultaneously taken in the first clock cycle;

finding a set of data samples included in the plurality of data samples, the set of data samples includes one or more consecutive data samples that have a uniform magnitude; and promoting the set of data samples as a peak responsive to the uniform magnitude being higher than at least one of a magnitude of a first data sample taken during a second clock cycle and immediately preceding the set of data samples and a magnitude of a second data sample taken during a third clock cycle and immediately following the set of data samples.

2. A method as recited in claim 1, further comprising:
when at least one data sample, that is taken in the third clock cycle and immediately follows the set of data samples, has a same magnitude as the uniform magnitude, promoting the set of data samples as the peak responsive to the uniform magnitude being larger than a magnitude of a data sample that immediately follows the at least one data sample.

3. A method as recited in claim 1, further comprising:
when at least one data sample, which is taken in the third clock cycle and immediately follows the set of data samples, has a same magnitude as the uniform magnitude, promoting the set of data samples as the peak responsive to a time duration of the at least one data sample exceeding a preset time interval.

4. A method as recited in claim 1, further comprising:
responsive to the promotion, not detecting a peak of the data stream during a time interval that is commensurate with the uniform magnitude.

5. A method as recited in claim 1, further comprising:
ruling out the peak responsive to the uniform magnitude being below a preset threshold.

6. A system for detecting a peak of an ultra-wide-band (UWB) signal in a data stream, comprising:
one or more processors; and
a non-transitory computer-readable medium or media comprising one or more sequences of instructions which, when executed by the one or more processors, causes steps to be performed comprising:
selecting a portion of the data stream in a first clock cycle, the portion of the data stream includes a plurality of data samples that are simultaneously taken in the first clock cycle;
finding a set of data samples included in the plurality of data samples, the set of data samples includes one or more consecutive data samples that have a uniform magnitude; and
promoting the set of data samples as a peak responsive to the uniform magnitude being higher than at least one of a magnitude of a first data sample taken during a second clock cycle and immediately preceding the set of data samples and a magnitude of a second data sample taken during a third clock cycle and immediately following the set of data samples.

7. A system as recited in claim 6, wherein the steps further comprise:
when at least one data sample, that is taken in the third clock cycle and immediately follows the set of data samples, has a same magnitude as the uniform magnitude, promoting the set of data samples as the peak responsive to the uniform magnitude being larger than a magnitude of a data sample that immediately follows the at least one data sample.

8. A system as recited in claim 6, wherein the steps further comprise:
when at least one data sample, which is taken in the third clock cycle and immediately follows the set of data samples, has a same magnitude as the uniform magnitude, promoting the set of data samples as the peak responsive to a time duration of the at least one data sample exceeding a preset time interval.

9. A system as recited in claim 6, wherein the steps further comprise:
responsive to the promotion, not detecting a peak of the data stream during a time interval that is commensurate with the uniform magnitude.

10. A system as recited in claim 6, wherein the steps further comprise:
ruling out the peak responsive to the uniform magnitude being below a preset threshold.

11. A system as recited in claim 6, further comprising:
multiple receivers that each receive a UWB signal; and
a device coupled to the multiple receivers, the device generates the data stream using the UWB signals sent by the multiple receivers.

12. A system as recited in claim 11, further comprising:
a switch disposed between the multiple receivers and the device, the switch controls data flow from the multiple receivers to the device.

* * * * *